Aug. 7, 1934.  H. K. ANSINGH  1,969,493
FAN COOLED ELECTRIC MOTOR
Filed April 6, 1933  2 Sheets-Sheet 1
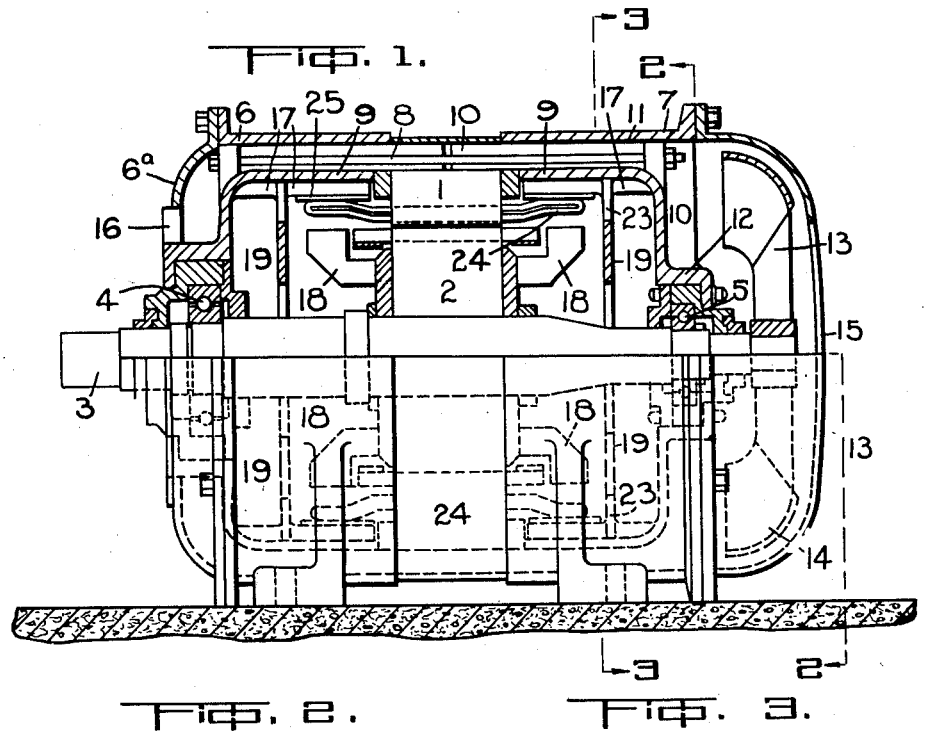
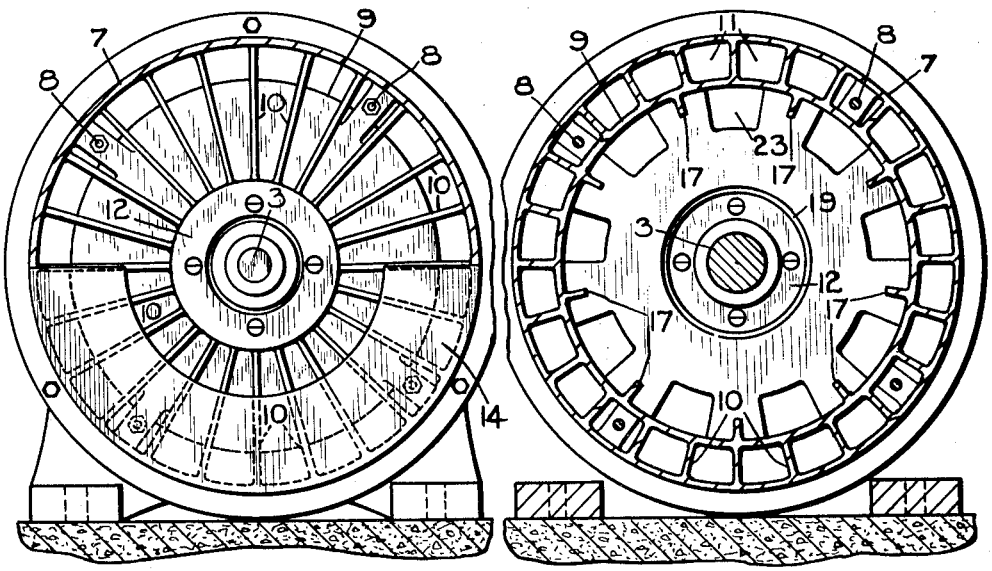
Inventor
H. K. ANSINGH
By *J.C.M. Fetherstonhaugh*
Attorneys Aug. 7, 1934.  H. K. ANSINGH  1,969,493
FAN COOLED ELECTRIC MOTOR
Filed April 6, 1933  2 Sheets-Sheet 2
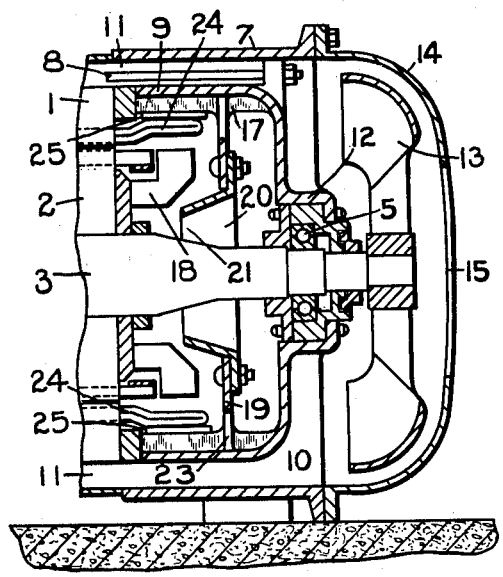
Fig. 4.
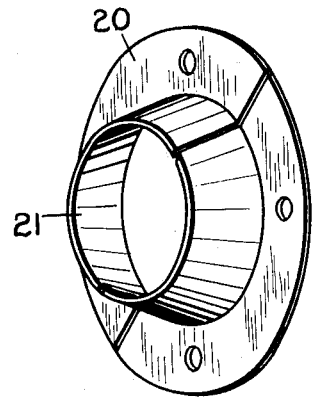
Fig. 5.
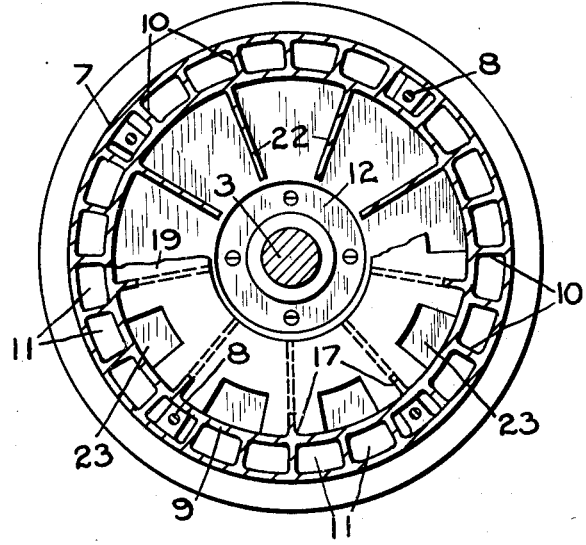
Fig. 6.
Fig. 7.
Inventor
H. K. ANSINGH
By
Attorneys Patented Aug. 7, 1934

1,969,493

UNITED STATES PATENT OFFICE 1,969,493

FAN COOLED ELECTRIC MOTOR

Herman Kimball Ansingh, St. Catharines, Ontario, Canada, assignor to English Electric Company of Canada, Limited, St. Catharines, Ontario, Canada, a company of Canada Application April 6, 1933, Serial No. 664,790
In Canada February 27, 1933

6 Claims. (Cl. 172—36)

My invention relates to improvements in fan cooled electric motors, and the object of the invention is to devise means for conducting the heat generated in the rotor or stator or both to the exterior of the motor wherein it is dissipated by the cooled air from the fan impinging upon such exterior. A further object is to provide a heat conducting means associated with the metallic casing of the motor and extending into proximity to the source of heat which will rapidly radiate such heat to the outer part of the casing wherein it is dissipated as referred to above.

With the above and other objects in view which will hereinafter appear as the description proceeds, my invention consists, in its preferred embodiment, of the construction all as hereinafter more particularly described and illustrated in the accompanying drawings in which:—

Fig. 1 represents a longitudinal section through an electric motor constructed according to my invention showing my heat radiating means disposed therein.

Fig. 2 is an end view taken from the fan end of the motor partly in section, such section being taken through the line 2—2 (Fig. 1).

Fig. 3 is a vertical cross section taken through the line 3—3 (Fig. 1).

Fig. 4 illustrates in vertical section the fan end of a motor constructed in accordance with my invention wherein my heat radiating means is provided with an extension to bring the metal thereof closer to the source of heat.

Fig. 5 is an enlarged perspective view showing the construction of the extension illustrated in Fig. 4.

Fig. 6 is a vertical cross section of a further modified form of heat radiating means, and Fig. 7 is a fragmentary longitudinal section of the modification shown in Fig. 6.

Like characters of reference indicate corresponding parts in the different views.

1 is the stator and 2 the rotor mounted on the shaft 3, which latter is journalled in the bearings 4 and 5 disposed in the portions 6 and 7 of the transversely divided metal casing surrounding the rotor and stator. The casing portions 6 and 7 are secured together by the longitudinal bolts 8 and each includes spaced apart concentric inner walls 9 which are connected to the outer walls 6 or 7 by longitudinal radially disposed webs 10 which divide the casing portions into a number of longitudinal air passageways or ducts 11, such webs at the fan end of the casing extending to its bearing boss 12, the fan 13 being mounted on the rotor shaft 3 and being protected by the shield 14 which is secured to the end of the casing portion 7. The shield 14 is provided with an air inlet orifice 15, and the casing portion 6 having secured thereto an end shield 6ª with an air outlet 16 disposed concentrically with the rotor shaft 3.

Longitudinal radially disposed ribs 17 extend inwardly from the inner walls 9 of the casing portions 6 and 7.

A rotor fan 18 is mounted on each end of the rotor for circulating the heated air in the interior of the motor.

In order to increase the conduction of the heat from the rotor or stator to the exterior of the motor, a metallic radiating ring 19 is disposed substantially vertically in the interior of each portion 6 or 7 of the casing in spaced relation to the rotor fan 18 and to the ends of the casing portion which constitute the bearing supports. These rings 19 may be cast integrally with the casing portions 6 or 7 or they may be formed separately and secured thereto. The inner periphery of each ring preferably extends into proximity to the heat zone and for this purpose, as illustrated in Figs. 4 and 5, the ring as shown in Figs. 1 and 3 may be provided with an extension in the form of a supplemental ring 20 secured to the ring 19 and provided with a truncated conical portion 21 extending towards the heat zone. The ring 20 would preferably be split to enable it to be removed to withdraw the casing portion over the bearings 5.

Furthermore, as illustrated in Figs. 6 and 7 radial webs 22 may extend between the rings 19 and the bearing supporting ends of the casing portions 6 and 7.

Apertures 23 are provided through the rings 19 in the vicinity of their outer peripheries and the heated air in the interior of the motor which is circulated outwardly by the rotor fans 18 impinges upon the inner walls 9 of the portions 6 and 7, being deflected through the apertures 23 inwardly through the spaces between the rings and the bearing support ends of the casing portions 6 and 7 and through the interior of such rings completing the cycle. During such cycle the heated air comes into contact with the metal ring 19 and the ends of the casing portions 6 and 7 being radiated towards the exterior of the casing portions which are cooled by the cool air passing from the fan 13 through the ducts 11 and out of the outlet 16. Thus such heat is efficiently dissipated and the motor is kept considerably cooler than where no heat radiating rings are employed.

The ribs 17 which lie in close proximity to the stator coils 24 being separated therefrom by interposed insulation 25 also aid in rapidly increasing the radiation of the heat generated in such coils.

It is to be understood that the form of casing may be subject to many variations and that shown is to be taken in an illustrative and not in a limiting sense. For instance the casing portions may be made up of welded sections instead of being cast or in any other suitable manner, and the ends of the portions may or may not constitute supports for the rotor shaft bearings, which latter may be supported in various other ways.

While the heat radiating rings as illustrated in Figs. 1 and 3 will suffice for providing efficient cooling of the motor in ordinary applications, where the motor is to be designed to very small dimensions for a given capacity which requires the dissipation of more heat in a smaller area, the modified forms as illustrated in Figs. 4 and 5 and Figs. 6 and 7 may be employed.

Although I have described and illustrated my heat radiating member as applied to fan cooled electric motors in which the motor casing is double walled with air ducts between the walls, it is to be understood that it would be suscepticle for use with any enclosed motor employing an exterior casing.

What I claim as my invention is:

1. In a fan cooled electric motor, the combination with the rotor, stator and fan, of an annular casing surrounding the stator and comprising concentric inner and outer spaced apart walls joined by spaced apart longitudinal radial webs dividing the intervening space into a plurality of open ended air ducts through which the air from the fan passes, said inner wall having inwardly extending heat conducting ring portions arranged substantially perpendicular to the axis of the motor with their inner peripheries disposed in the zone of the heat generated in the rotor.

2. In a fan cooled electric motor as claimed in claim 1 wherein the casing is divided transversely into two opposed portions adapted to be secured together with their wall portions and webs in register, and the heat conducting portions are formed on the inner wall of each portion.

3. In a fan cooled electric motor as claimed in claim 1 in which the heat conducting portions have perforations extending therethrough in the vicinity of their junction with the inner wall of the casing.

4. In a fan cooled electric motor as claimed in claim 1, divided truncated conical heat conducting extensions respectively secured to the heat conducting portions and directed further into the zone of the heat generated by the rotor.

5. In a fan cooled electric motor, the combination with the rotor, stator and fan, of an annular casing surrounding the stator and comprising concentric inner and outer spaced apart walls joined by spaced apart longitudinal radial webs dividing the intervening space into a plurality of open ended air ducts through which the air from the fan passes, said inner wall of the casing having inwardly extending heat conducting ring portions arranged substantially perpendicular to the axis of the motor with their inner peripheries disposed in the zone of the heat generated in the rotor as well as longitudinal heat conducting radial ribs extending inwardly with their free edges in proximity to the stator.

6. In a fan cooled electric motor as claimed in claim 5 wherein the casing is divided transversely into two portions adapted to be secured together with wall portions and webs in register and the ribs are formed on the inner wall of each portion.

HERMAN KIMBALL ANSINGH.